US012401941B2

(12) United States Patent
Ho

(10) Patent No.: US 12,401,941 B2
(45) Date of Patent: Aug. 26, 2025

(54) SOUND GENERATING MODULE

(71) Applicant: BENQ CORPORATION, Taipei (TW)

(72) Inventor: Shih-Chuan Ho, Taipei (TW)

(73) Assignee: BenQ Corporation, Taipei (TW)

( * ) Notice: Subject to any disclaimer, the term of this patent is extended or adjusted under 35 U.S.C. 154(b) by 279 days.

(21) Appl. No.: 18/181,586

(22) Filed: Mar. 10, 2023

(65) Prior Publication Data

US 2024/0267672 A1 Aug. 8, 2024

(30) Foreign Application Priority Data

Feb. 7, 2023 (TW) ................................ 112104325

(51) Int. Cl.
*H04R 1/28* (2006.01)
*H04R 1/02* (2006.01)

(52) U.S. Cl.
CPC ........... *H04R 1/2811* (2013.01); *H04R 1/021* (2013.01)

(58) Field of Classification Search
None
See application file for complete search history.

(56) References Cited

U.S. PATENT DOCUMENTS 4,437,541 A * 3/1984 Cross ........................ H04R 1/26 181/151
4,799,264 A * 1/1989 Plummer ............... H04R 1/023 181/146
11,546,701 B2 * 1/2023 Qi .......................... H04R 9/066
2018/0279039 A1 * 9/2018 Matsumura ............ H04R 1/288
2020/0177988 A1 * 6/2020 Zastoupil ................. H04R 1/24

FOREIGN PATENT DOCUMENTS

WO 2022185866 9/2022

OTHER PUBLICATIONS

English language translation of WO 2022/185866A1, pp. 1-5. (Year: 2022).*
"Office Action of Taiwan Counterpart Application", issued on Feb. 20, 2024, p. 1-p. 5.

* cited by examiner

*Primary Examiner* — Paul W Huber

(57) ABSTRACT

The invention provides a sound generating module including a baffle and a speaker. The baffle has a containing opening. The speaker is disposed on the baffle and in the containing opening. A sound spectrum of the speaker itself has at least one peak. A wavelength corresponding to the at least one peak includes λ. The baffle has at least one first sound hole. A distance from a center of the first sound hole to a center of the speaker is greater than or equal to λ/4 and is less than or equal to λ/2.

19 Claims, 6 Drawing Sheets

100a

SOUND GENERATING MODULE

CROSS-REFERENCE TO RELATED APPLICATION

This application claims the priority benefit of Taiwan application serial no. 112104325, filed on Feb. 7, 2023. The entirety of the above-mentioned patent application is hereby incorporated by reference herein and made a part of this specification.

BACKGROUND

Technical Field

The disclosure relates to a sound generating module.

Description of Related Art

A sound generating module may include a speaker, a baffle, or further a sound box, which may emit a corresponding sound according to an electrical signal to restore a sound recorded by a microphone. Therefore, the sound generating module has become one of the important electronic products or electronic components in the current multimedia era.

For speaker systems on the market, whether being a full sound-box-type speaker or a baffle-type speaker, it is difficult for frequency response curves of the speakers to be flat. In order to achieve making the response curve flat, adjusting an electronic equalizer (EQ) or crossover is mostly adopted in the related art. However, such a processing method is likely to cause disadvantages such as early sound distortion, reduction of efficiency and sensitivity, and the like.

SUMMARY

The disclosure provides a sound generating module, which can achieve the effect of adjusting the frequency response curve in a way of acoustic filtering, and can effectively avoid sound distortion.

An embodiment of the disclosure provides a sound generating module, including a baffle and a speaker. The baffle has a containing opening, and the speaker is disposed on the baffle and in the containing opening. A sound spectrum of the speaker itself has at least one peak, and a wavelength corresponding to the at least one peak includes λ. The baffle has at least one first sound hole, and a distance from a center of the first sound hole to a center of the speaker is greater than or equal to λ/4 and is less than or equal to λ/2.

In the sound generating module of the embodiment of the disclosure, the first sound hole is designed on the baffle, and the distance from the center of the first sound hole to the center of the speaker is greater than or equal to λ/4 and is less than or equal to λ/2. Therefore, the sound waves of a wavelength near λ and generated at the front side and the back side of the speaker may generate a destructive interference at the first sound hole to flatten the frequency response curve. Therefore, the sound generating module of the embodiment of the disclosure can achieve the effect of adjusting the frequency response curve in a way of acoustic filtering, and can effectively avoid sound distortion.

DESCRIPTION OF THE EMBODIMENTS

Figure 1:
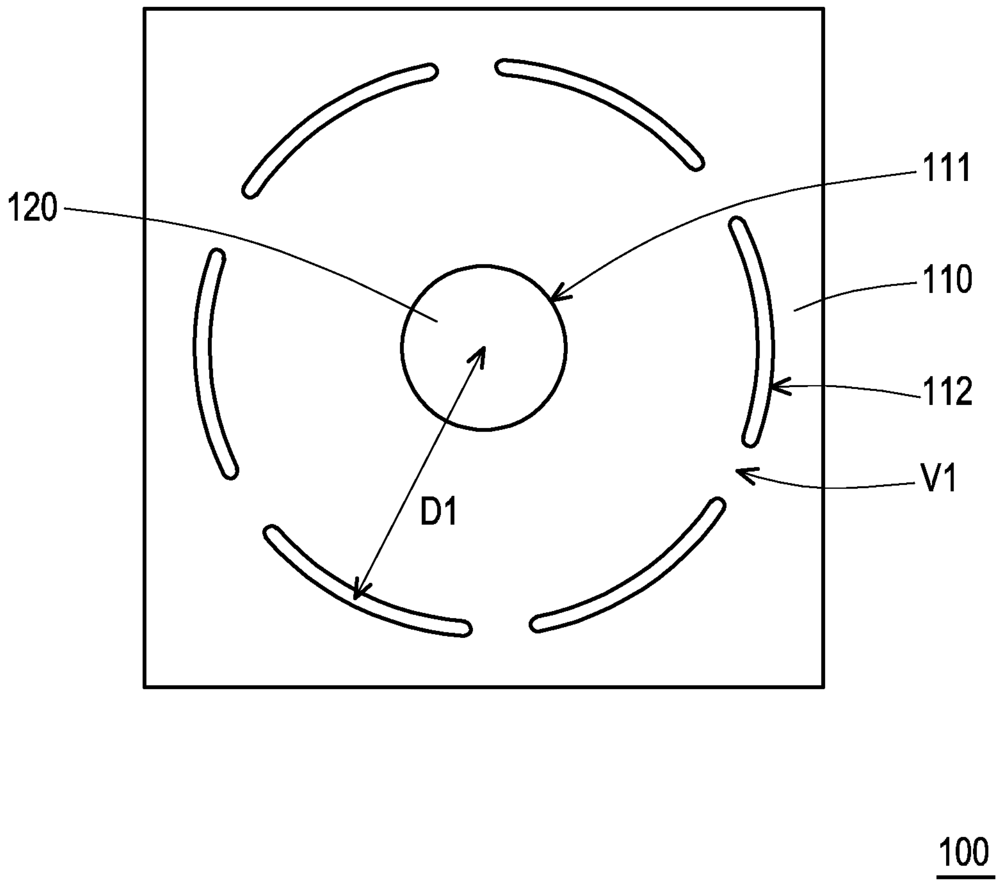
FIG. 1 is a schematic front view of a sound generating module according to an embodiment of the disclosure.
Figure 2:
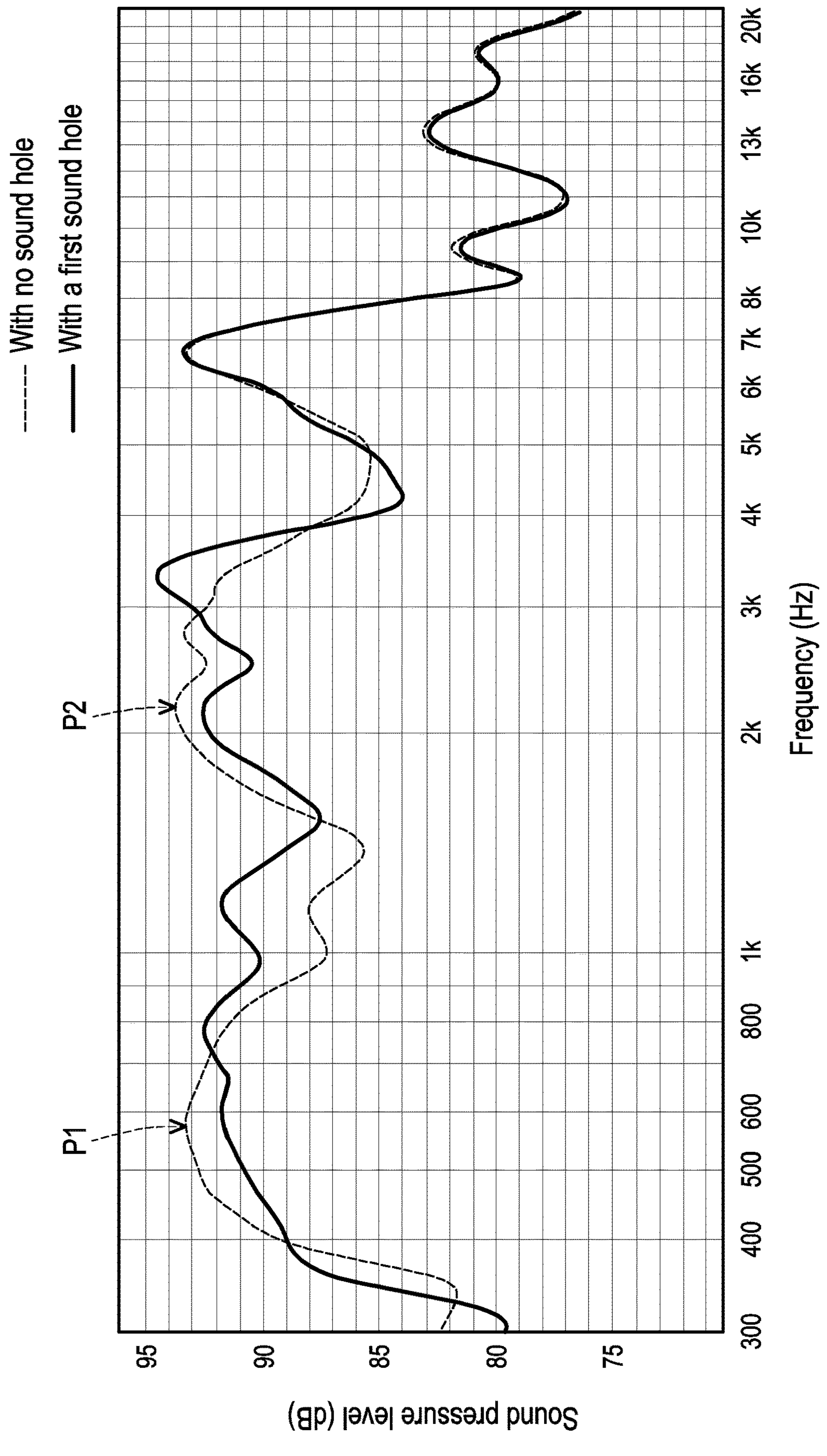
FIG. 2 is a view of frequency response curves of a sound generating module control group with no sound hole in a baffle and the sound generating module with a first sound hole in FIG. 1.

FIG. 1 is a schematic front view of a sound generating module according to an embodiment of the disclosure, and FIG. 2 is a view of frequency response curves of a sound generating module control group with no sound hole in a baffle and a sound generating module with a first sound hole in FIG. 1. Please refer to FIG. 1 and FIG. 2. A sound generating module 100 of this embodiment includes a baffle 110 and a speaker 120. The baffle 110 has a containing opening 111, and the speaker 120 is disposed on the baffle 110 and in the containing opening 111. In this embodiment, the speaker 120 is, for example, a transducer which converts electrical energy into acoustic energy. A sound spectrum of the speaker 120 itself is similar to the frequency response curve of the sound generating module with no sound hole in the baffle in FIG. 2, in which, the sound spectrum of the speaker 120 itself has at least one peak (for example, a peak P1 and a peak P2 in FIG. 2, a wavelength corresponding to the at least one peak includes λ (for example, the wavelength corresponding to the peak P1 is λ)). The baffle 110 has at least one first sound hole 112 (a plurality of the first sound holes 112 are taken as an example in FIG. 1), and a distance D1 from a center of the first sound hole 112 to a center of the speaker 120 is greater than or equal to λ/4 and is less than or equal to λ/2.

In the sound generating module 100 of this embodiment, the first sound hole 112 is designed on the baffle 110, and the distance D1 from the center of the first sound hole 112 to the center of the speaker 120 is greater than or equal to λ/4 and is less than or equal to λ/2. Therefore, the sound waves of the wavelength near λ and generated at the front side and the back side of the speaker 120 may generate a destructive interference at the first sound hole 112 to flatten the frequency response curve. Therefore, the sound generating module 100 of the embodiment of the disclosure can achieve the effect of adjusting the frequency response curve in a way of acoustic filtering, and can effectively avoid sound distortion.

Specifically, disposing the first sound hole 112 at ¼ of a wavelength corresponding to 720 Hz may control to start an attenuation below 720 Hz (so the solid curve below 720 Hz is lower than the dashed curve) and at the same time may increase a gain at ⅛ of the wavelength (approximately 700 Hz to 1400 Hz (at ¼ of the wavelength to ⅛ of the wavelength, the solid curve is higher than the dashed curve)) to achieve the purpose of physical acoustic filter tuning.

In this embodiment, these first sound holes 112 surround the speaker 120, and spacings V1 are between the first sound holes 112. In this embodiment, the first sound holes 112 are arranged in an equal-spacing ring shape. In addition, in this embodiment, the first sound hole 112 is a through hole penetrating through the front side and the back side of the baffle 110.

In an embodiment, the distance D1 from the center of the first sound hole 112 to the center of the speaker 120 is equal to λ/4, so that a forward sound wave on the front side of the speaker 120 and a reverse sound wave on the back side of the speaker 120 generate a destructive interference with respect to sound waves of a wavelength λ at the first sound hole 112.

Figure 3:
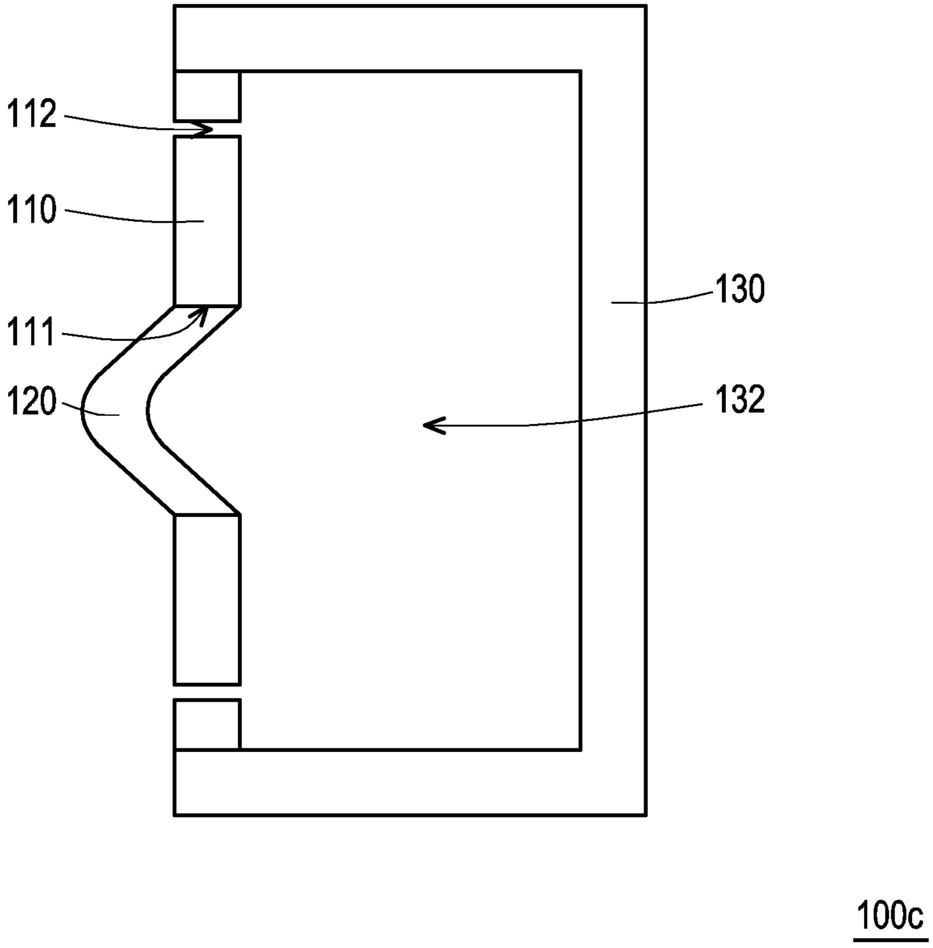
FIG. 3 is a schematic cross-sectional view of a sound generating module according to another embodiment of the disclosure.

In this embodiment, the first sound hole 112 is arc-shaped. For example, an arc shape formed by the first sound hole 112 is an arc shape with the center of the speaker 120 as the center. In addition, in this embodiment, no sound box may be disposed on a side of the baffle 110, that is to say, the sound generating module 100 of this embodiment is a baffle-type speaker. However, in another embodiment, as shown in the schematic cross-sectional view of the sound generating module shown in FIG. 3, a sound generating module 100*c* further includes a sound box 130, in which the baffle 110, the speaker 120, and the sound box 130 surround a space 132. In other words, the sound generating module 100*c* is a sound-box-type speaker.

Figure 4:
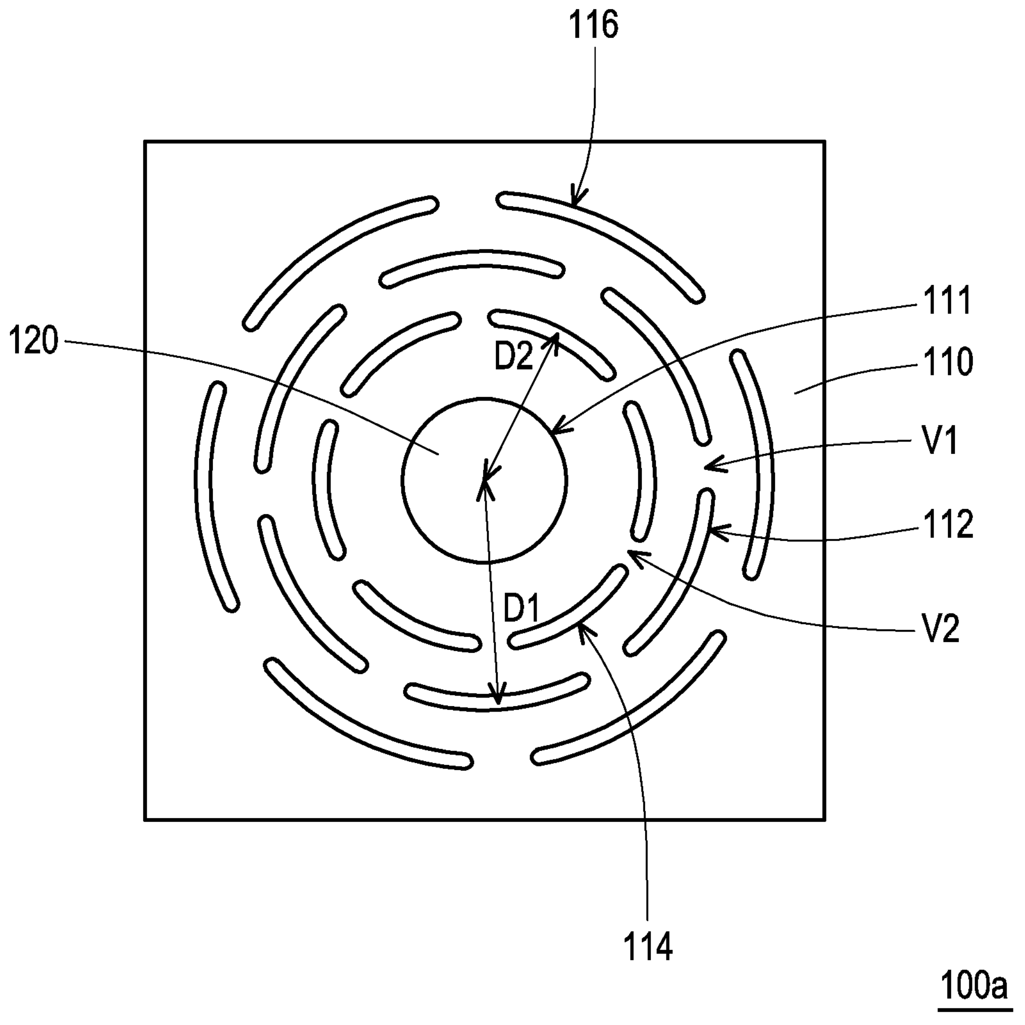
FIG. 4 is a schematic front view of a sound generating module according to another embodiment of the disclosure.

FIG. 4 is a schematic front view of a sound generating module according to another embodiment of the disclosure. Please refer to FIG. 2 and FIG. 4. A sound generating module 100*a* of this embodiment is similar to the sound generating module 100 in FIG. 1, and the differences between the two are as follows. In the sound generating module 100*a* of this embodiment, a wavelength corresponding to another peak P2 of the sound spectrum of the speaker 120 itself is δ, the baffle 110 has at least one second sound hole 114 (a plurality of the second sound holes 114 are taken as an example in FIG. 4), and a distance D2 from a center of the second sound hole 114 to the center of the speaker 120 is greater than or equal to δ/4 and is less than or equal to δ/2, in which δ is not equal to λ. In this way, the other peak P2 in the frequency response curve may also be flattened. In an embodiment, the distance D2 from the center of the second sound hole 114 to the center of the speaker 120 is equal to δ/4, so that the forward sound wave on the front side of the speaker 120 and the reverse sound wave on the back side of the speaker 120 generate a destructive interference with respect to sound waves of a wavelength δ at the second sound hole 114.

In this embodiment, the second sound holes 114 surround the speaker 120, and spacings V2 are between the second sound holes 114. In this embodiment, the second sound holes 114 are arranged in an equal-spacing ring shape. In this embodiment, the distance D2 from the center of the second sound hole 114 to the center of the speaker is not equal to the distance D1 from the center of the first sound hole 112 to the center of the speaker. In addition, in this embodiment, the first sound holes 112 surround the second sound holes 114. In this embodiment, the first sound holes 112 surround the second sound holes 114 in a dislocation manner compared with the second sound holes 114, and the first sound holes 112 and the second sound holes 114 are arranged in a concentric ring shape.

In this embodiment, the second sound hole 114 is a through hole penetrating through the front side and the back side of the baffle 110. In this embodiment, the second sound hole 114 is arc-shaped. For example, an arc shape formed by the second sound hole 114 is an arc shape with the center of the speaker 120 as the center.

In an embodiment, the sound spectrum of the speaker 120 itself may also have one or more other peaks, the baffle 110 may also have one or more other sound holes (such as a third sound hole 116 in FIG. 4), and distances from centers of other sound holes to the center of the speaker 120 are greater than or equal to ¼ of wavelengths corresponding to other peaks and are less than or equal to ½ of the wavelengths corresponding to the other peaks. In an embodiment, the distances from the centers of the other sound holes to the center of the speaker 120 are equal to ¼ of the wavelengths corresponding to the other peaks. That is to say, in other embodiments, sound holes with different distances from the center of the speaker 120 may be designed for different peaks.

Figure 5:
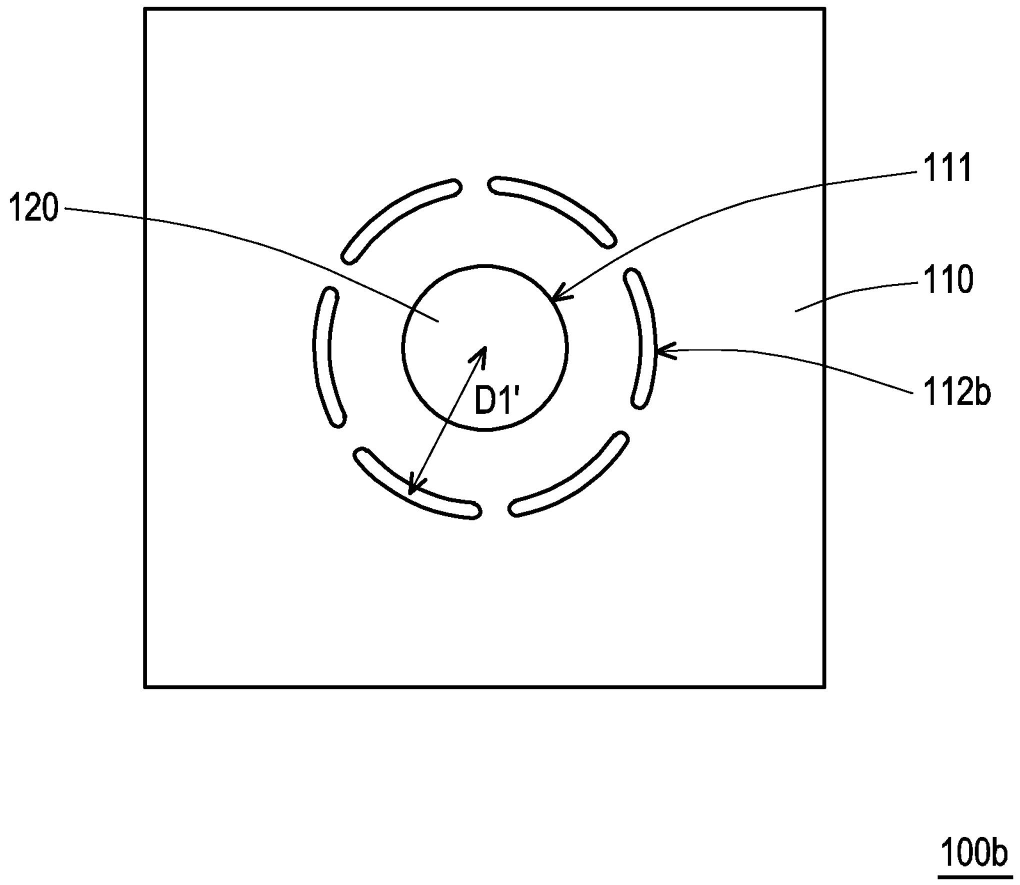
FIG. 5 is a schematic front view of a sound generating module according to another embodiment of the disclosure.
Figure 6:
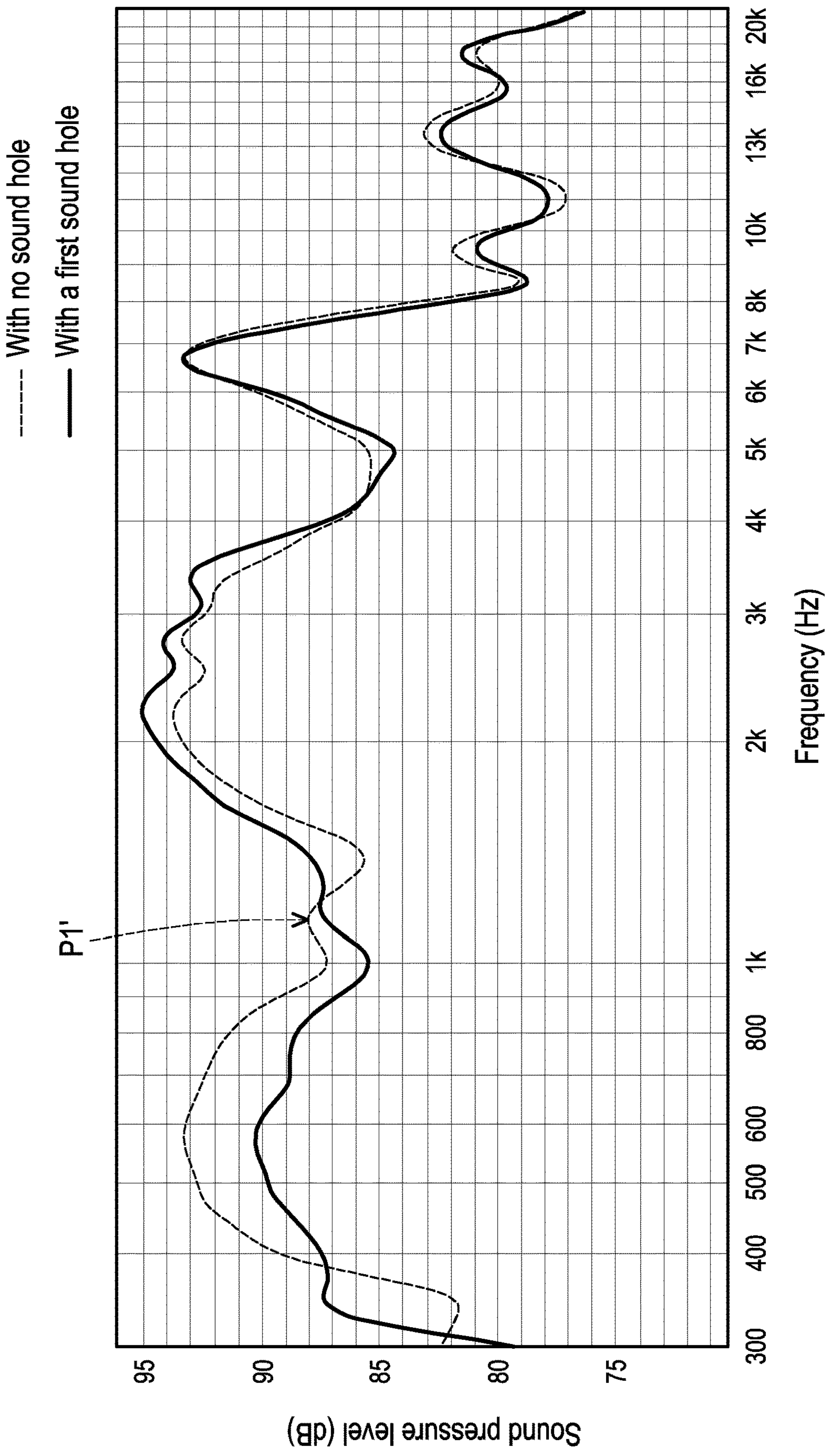
FIG. 6 is a view of frequency response curves of a sound generating module control group with no sound hole in a baffle and the sound generating module with the first sound hole in FIG. 5.

FIG. 5 is a schematic front view of a sound generating module according to another embodiment of the disclosure, and FIG. 6 is a view of frequency response curves of a sound generating module control group with no sound hole in a baffle and a sound generating module with a first sound hole in FIG. 5. A sound generating module 100*b* of this embodiment is similar to the sound generating module 100 of FIG. 1, and the differences between the two are that in the sound generating module 100*b* of this embodiment, a distance D1' from the center of a first sound hole 112*b* to the center of the speaker 120 is shorter than the distance D1 in FIG. 1, and a peak P1' corresponding to the design of the first sound hole 112*b* is also different from the peak P1 corresponding to the design of the first sound hole 112 in FIG. 1. In this embodiment, disposing the first sound hole 112*b* at ¼ of a wavelength corresponding to 1.22 KHz may control to start an attenuation below 1.22 KHz (so the solid curve below 1.22 KHz is lower than the dashed curve) and at the same time may increase a gain at ⅛ of the wavelength (approximately 1.22 KHz to 2.44 KHz (at ¼ of the wavelength to ⅛ of the wavelength, the solid curve is higher than the dashed curve)) to achieve the purpose of physical acoustic filter tuning.

In summary, in the sound generating module of the embodiment of the disclosure, the first sound hole is designed on the baffle, and the distance from the center of the first sound hole to the center of the speaker is greater than or equal to λ/4 and is less than or equal to λ/2. Therefore, the sound waves of a wavelength near λ and generated at the front side and the back side of the speaker may generate a destructive interference at the first sound hole to flatten the frequency response curve. Therefore, the sound generating module of the embodiment of the disclosure can achieve the effect of adjusting the frequency response curve in a way of acoustic filtering, and can effectively avoid sound distortion.

What is claimed is:

1. A sound generating module, comprising:

a baffle having a containing opening; and a speaker, disposed on the baffle and in the containing opening, wherein a sound spectrum of the speaker itself has at least one peak, a wavelength corresponding to the at least one peak comprises λ, the baffle has at least one first sound hole, and a distance from a center of the first sound hole to a center of the speaker is greater than or equal to λ/4 and is less than or equal to λ/2, and wherein the at least one peak comprises a peak of the wavelength corresponding to λ and another peak of a wavelength corresponding to δ, the baffle further has at least one second sound hole, and a distance from a center of the second sound hole to the center of the speaker is greater than or equal to δ/4 and is less than or equal to δ/2, wherein δ is not equal to λ.

2. The sound generating module according to claim 1, wherein the at least one first sound hole is a plurality of first sound holes, the plurality of first sound holes surround the speaker, and spacings are between the plurality of first sound holes.

3. The sound generating module according to claim 2, wherein the plurality of first sound holes are arranged in an equal-spacing ring shape.

4. The sound generating module according to claim 1, wherein the distance from the center of the first sound hole to the center of the speaker is equal to $\lambda/4$, so that a forward sound wave on a front side of the speaker and a reverse sound wave on a back side of the speaker generate a destructive interference with respect to sound waves of the wavelength $\lambda$ at the first sound hole.

5. The sound generating module according to claim 1, wherein the first sound hole is a through hole passing through a front side and a back side of the baffle.

6. The sound generating module according to claim 1, wherein the first sound hole is arc-shaped.

7. The sound generating module according to claim 6, wherein an arc shape formed by the first sound hole is an arc shape with the center of the speaker as a center.

8. The sound generating module according to claim 1, wherein the at least one second sound hole is a plurality of second sound holes, the plurality of second sound holes surround the speaker, and spacings are between the plurality of second sound holes.

9. The sound generating module according to claim 8, wherein the plurality of second sound holes are arranged in an equal-spacing ring shape.

10. The sound generating module according to claim 1, wherein the distance from the center of the second sound hole to the center of the speaker is not equal to the distance from the center of the first sound hole to the center of the speaker.

11. The sound generating module according to claim 1, wherein the at least one first sound hole is a plurality of first sound holes, the at least one second sound hole is a plurality of second sound holes, and the plurality of first sound holes surround the plurality of second sound holes.

12. The sound generating module according to claim 11, wherein the plurality of first sound holes surround the plurality of second sound holes in a dislocation manner compared with the plurality of second sound holes.

13. The sound generating module according to claim 11, wherein the plurality of first sound holes and the plurality of second sound holes are arranged in a concentric ring shape.

14. The sound generating module according to claim 1, wherein the distance from the center of the second sound hole to the center of the speaker is equal to $\delta/4$, so that a forward sound wave on a front side of the speaker and a reverse sound wave on a back side of the speaker generate a destructive interference with respect to sound waves of the wavelength $\delta$ at the second sound hole.

15. The sound generating module according to claim 1, wherein the second sound hole is a through hole passing through a front side and a back side of the baffle.

16. The sound generating module according to claim 1, wherein the second sound hole is arc-shaped.

17. The sound generating module according to claim 16, wherein an arc shape formed by the second sound hole is an arc shape with the center of the speaker as a center.

18. The sound generating module according to claim 1, further comprising a sound box, wherein the baffle, the speaker, and the sound box surround a space.

19. The sound generating module according to claim 1, wherein no sound box is disposed on a side of the baffle.

* * * * *